United States Patent
Volz

[11] Patent Number: 5,154,495
[45] Date of Patent: Oct. 13, 1992

[54] PROCESS (OF) FOR OPERATING A MASTER CYLINDER

[75] Inventor: Peter Volz, Darmstadt, Fed. Rep. of Germany

[73] Assignee: Alfred Teves GmbH, Frankfurt am Main, Fed. Rep. of Germany

[21] Appl. No.: 445,599
[22] PCT Filed: Mar. 20, 1989
[86] PCT No.: PCT/EP89/00297
§ 371 Date: Dec. 11, 1989
§ 102(e) Date: Dec. 11, 1989
[87] PCT Pub. No.: WO89/10287
PCT Pub. Date: Nov. 2, 1989

[30] Foreign Application Priority Data
Apr. 20, 1988 [DE] Fed. Rep. of Germany ..... 38131730

[51] Int. Cl.$^5$ ............ B60T 8/40; B60T 8/44
[52] U.S. Cl. ............ 303/113 SS; 303/116 R; 303/D4
[58] Field of Search ....... 404/113 SS, 113 R, DIG. 3, 404/DIG. 4, 116 R, 114 TB, 10

[56] References Cited
U.S. PATENT DOCUMENTS

| | | | |
|---|---|---|---|
| 3,823,985 | 7/1974 | Hubbard | 303/DIG. 3 |
| 4,779,937 | 10/1988 | Burgdorf et al. | 303/116 R |
| 4,820,255 | 5/1989 | Volz | 303/113 SS |
| 4,919,493 | 4/1990 | Leiber | 303/113 SS |
| 4,919,496 | 4/1990 | Buregdorf et al. | 303/113 SS |
| 5,039,175 | 8/1991 | Holzmann et al. | 303/116 R |

FOREIGN PATENT DOCUMENTS

| | | | |
|---|---|---|---|
| 3511579 | 10/1986 | Fed. Rep. of Germany | 303/113 SS |
| 0186755 | 10/1984 | Japan | 303/DIG. 3 |

Primary Examiner—Matthew C. Graham
Attorney, Agent, or Firm—Robert P. Seitter; J. Gordon Lewis

[57] ABSTRACT

A process is described for positioning the brake pedal during the automatic control mode in an automotive antilocking brake system, in which the pressure in the master cylinder is sensed at a point located where the master cylinder piston sweeps past so that either high or low pressure is sensed depending on the brake pedal position. The pressure sensing is used to generate an electrical signal which is processed in the system controller to it turn generate a control signal transmitted to a pump motor to cause delivery of a volume of fluid to the master cylinder so as to position the brake pedal in the desired position.

7 Claims, 3 Drawing Sheets

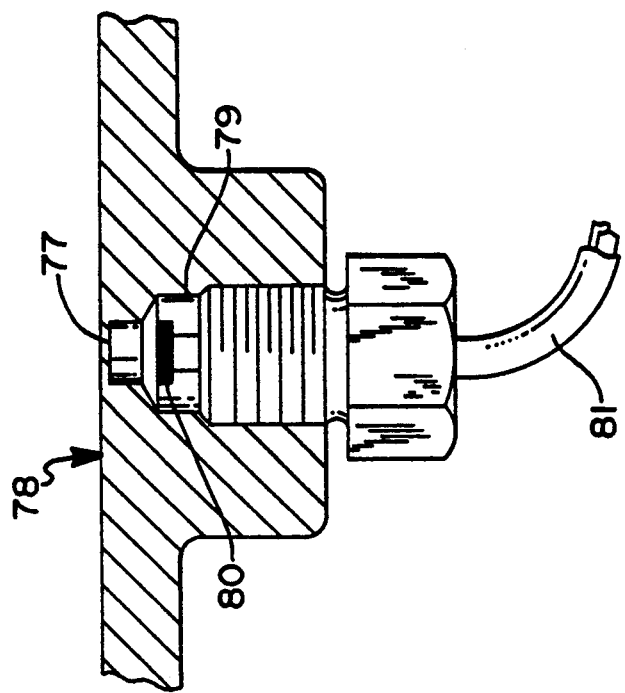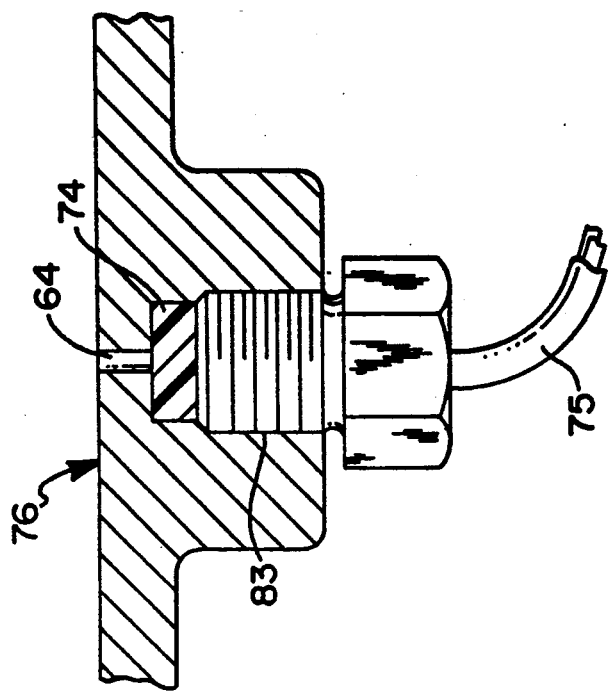

PROCESS (OF) FOR OPERATING A MASTER CYLINDER

BACKGROUND OF THE INVENTION

The present invention relates to a process for operating a master cylinder of a brake pressure control system, in particular, an anti-locking control system (ALC-system), or a traction slip control system (TSC-system), for use with automotive vehicles. The control system comprises at least one pump the rate of delivery of which is variable and which, in the control mode, serves to position at least one working piston of the master cylinder. The control system further comprises a pressure modulator modulating the pressure in the wheel cylinders during the control mode, and comprises an electronic controller processing wheel sensor signals to form regulating signals for the passage and blocking valves of the pressure modulator.

Anti-locking control systems are increasingly being used in the automotive industry. In these systems the hydraulic pumps for generating an auxiliary pressure, in the control mode, are employed. An anti-locking control system of this type is disclosed, for example, by German Patent Application P 37 31 603.6. This patent application describes a brake system, for use with automotive vehicles, comprising a master cylinder, wheel cylinders and an anti-locking control means. For positioning the piston of the master cylinder in a desired position in the control mode, a pressure fluid source, preferably a pump of a variable rate of delivery, is used which is in communication, through a hydraulic conduit, with the master cylinder and which, through its rate of delivery, positions the piston.

A problem with these known systems is that during the control mode, especially during the ALC- or TSE-mode, the pedal must be restored in a controlled manner. The position thereof, during the control mode, should be advanced relative to the normal initial position. Accordingly the so-called pedal "feel" is improved in accordance with the present invention while enhancing the safety of the entire system. Moreover, it is an object of the present invention to avoid the prior art sensors within the area of the booster or pedal, as in German Patent Application P 37 31 603.6.

SUMMARY OF THE INVENTION

It is therefore an object of the invention to have the control of the pedal positioning performed by elements provided in the area of the master cylinder. This provides a substantial manufacturing advantage, and decreases the manufacturing costs as no additional structural efforts are required in the area of the booster of the pedal work or the pedal itself. The structural efforts are reduced while the operating safety is enhanced. The customary gear-shift levers or sticks are eliminated. Accordingly the provision of additional brake conduits and additional valves is avoided. Moreover, a simplified assembly is attained. Further, the so-called pressure switch required by state-of-the-art brake pressure control system in the traction slip control mode is avoided.

In this respect, conventional brake pressure control systems exhibit a so-called TSC-valve the function of which is to separate, in TSC-mode, the working chamber of the master cylinder from the brake circuit of the actuated axle. The TSC-valve is, therefore, also designated by TSC-blocking valve. The TSC-valve, in the TSC-mode is, electromagnetically actuated, receiving its switching signal from the electronic controller and blocking, in the TSC-mode, the hydraulic pressure conduit leading from the master cylinder to the pressure modulator of the brake pressure control system. This pressure switch is a safety element. Once the brake pedal is applied, in the TSC-mode, the pressure in the master cylinder can be increased beyond the permitted level. The pressure in the master cylinder is sensed by the pressure switch. Once the permitted pressure threshold is exceeded, the pressure switch supplies a signal to the electronic controller. The electronic controller then causes, by failure to activate the actuating magnet of the TSC-valve, the TSC-valve to be returned to its open position corresponding to the resting position. This will establish a direct communication between the working chamber of the master cylinder and the wheel cylinder. As previously indicated, it is an object of the present invention to avoid the aforedescribed pressure switch.

This problem is overcome in that the hydraulic pressure is sensed at least at one point of the cylinder swept-over by the working piston, and in that the difference between the sensed pressure in the working chamber of the master cylinder, on the one hand, and in the intake chamber of the master cylinder, on the other hand, releases a signal. On the basis of the pressure differential signal, preferably after processing thereof in the electronic controller, the volume to be delivered to the working chamber for the desired positioning of the working chamber is controlled. This process may be modified so that at least at one point of the master cylinder detection is made of whether pressure, especially excessive pressure, is available, so that, based on the presence or absence of pressure, a YES/NO-signal is generated and, preferably, is supplied to the electronic controller of the brake pressure control system. For carrying out the process, in the master cylinder a pressure transducer is provided converting the pressure difference into an electric signal.

In preferred embodiments, the pressure transducer includes an electrical switch. The switch may be a semiconductor switch. According to an alternative embodiment, the pressure transducer includes a resistance stain gauge-type sensor. Moveover, the pressure transducer may comprise a piezo-resistive sensor, while according to another embodiment, the pressure transducer may include an optoelectrical sensor. In addition, the pressure transducer may include a sensor converting the elastic deflection of a part of the internal wall of the cylinder into an electric signal. According to still another embodiment, a capillary can be provided in communication with the working chamber and the intake chamber of the master cylinder, respectively. If including a membrane, the pressure converter may be provided with a sensor element and a pressure transmitting fluid. Once the pressure transducer works on a capillary, provision may be made for a rigid volume, preferably of a viscose-elastic material, for the pressure transmission. In a space-saving configuration the pressure transducer is of a configuration capable of being screwed into a master cylinder.

According to still another embodiment of the present invention, at least one pressure transducer is provided in the pressure chamber of the push rod piston and in the pressure chamber of the floating piston, respectively. Moreover, it is feasible to provide in at least one pressure chamber a plurality of pressure transducers in a series arrangement.

According to the present invention, since the cylindrical inner wall is thin at the measuring point, i.e., it is formed as a membrane, no damage is done to the primary sleeve of the working piston when sweeping over the measuring point. It is of particular advantage that the pressure switch can be eliminated as, in the practice of the present invention, the pressure in the working chamber is sensed.

BRIEF DESCRIPTION OF THE DRAWINGS

Further details of the invention will become manifest from the description of a number of embodiments as explained hereinafter with reference to the accompanying drawing, wherein:

FIGS. 3 and 4 show further details of the pressure transducer included in the system of FIG. 2 in alternative configurations.

DETAILED DESCRIPTION

Figure 1:
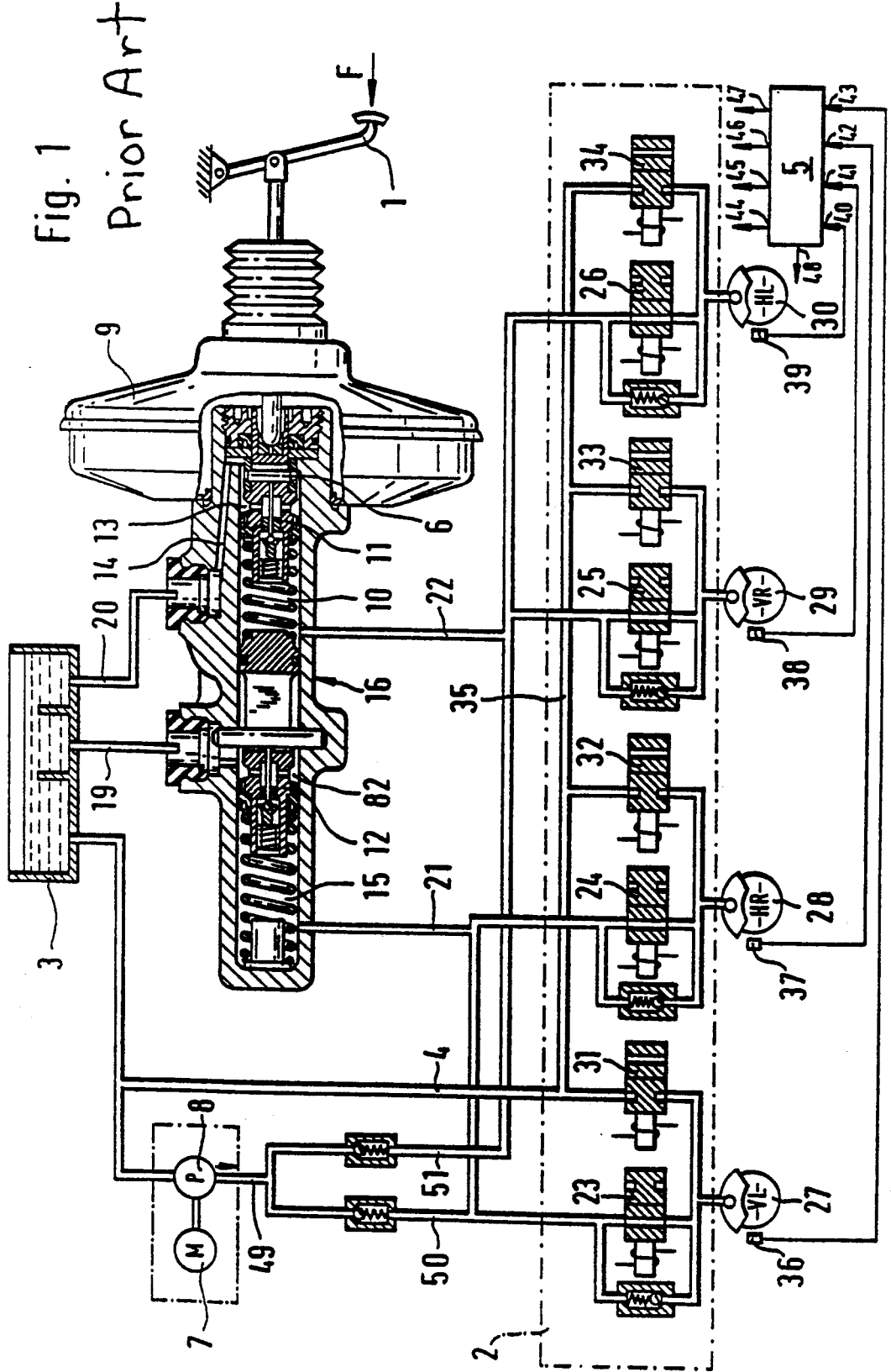
FIG. 1 shows an anti-locking control system.

The anti-locking control system according to FIG. 1 comprises a vacuum brake force booster 9 actuated by brake pedal 1, a tandem master cylinder 16, a modulator 2 for the pressure control in the anti-locking control mode, an electronic controller 5 for processing sensor signals, and a hydraulic pressure pump 8 actuated by an electromotor 7. FIG. 1 shows the brake system in the released position. The pressure chambers 10, 15 of the master cylinder are, in known manner, in communication with the pressure fluid reservoir 3 through open central valves, through connecting channels in the interior of the pistons, through a ring chamber in the intermediate piston, through ports and through hydraulic conduits 19, 29.

The two pressure circuits 21, 22 of the master cylinder are in communication with the wheel brakes 27, 28, 29, 30 through electromagnetically actuable valves which, in the basic position, are switched to passage. These are so-called "valves open in de-energized condition" (SO-valves) or inlet valves 23, 24, 25, 26. The wheel brakes 27, 28, and 29, 30, respectively connected in parallel are associated to the pressure circuits 21, 22 disposed in diagonal relationship. The following abbreviations have been used for the automotive wheels corresponding to the described brakes: VL refers to front-sided left; HR refers to the rear-sided right; VR to front-sided right and HL to rear-sided left. The wheel brakes 27, 28, 29, 30, moreover, through electromagnetically actuable output valves 31, 32, 33, 34 blocking in the basic position, so-called "valves closed in de-energized condition, through a hydraulic return conduit 35, and through conduit 4, are capable of being placed into communication with the reservoir or pressure compensating reservoir 3.

The vehicle wheels are furnished with sensors 36, 37, 38, 39 cooperating with ratchet wheels engaged in synchronism with the wheel rotation, generating electric signals identifying the wheel rotating pattern, i.e., the wheel peripheral speed and changes in that speed. These signals, through inputs 40, 41, 42, 43 are supplied to the electronic controller 5. The electronic controller processes the sensor signals into output signals in accordance with a control algorithm stored therein by way of which output signals, in the brake pressure control mode, the SO-valves and the SG-valves are switched to thereby decrease, keep constant or re-increase the brake pressures in the individual wheel cylinders of the disc brakes, in accordance with the control algorithm. For this purpose, the actuating magnets of the SO-valves and SG-valves are excited through the outputs 44, 45, 46, 47 of the electronic controller. For clarity, the electrical connecting conduits between the outputs 44, 45, 46, 47 and the windings of the SO- and SG-valves are not shown in the drawing.

In the brake pressure control mode, the electromotor 7 of the pump 8 is actuated. The switch-on signal is provided to the motor by the output 48 of the electronic controller 5. The pump, in the control mode, builds up pressure in the pressure conduits 49, 50, 51. The conduits constitute a pressure fluid guide in communication with the pressure fluid guide of the tandem master cylinder in the form of pressure conduits 21, 22. Hence, in the control mode, the pressure chambers 10, 15 of the tandem master cylinder are pressurized through the pump. With the brake applied, in the normal brake mode, the pedal force F, augmented by the force developed by the vacuum in the booster 9, is transmitted to the master cylinder pistons. The central control valves in these pistons close to thereby enable brake pressure to build up in the pressure chambers 10, 15, and, hence, in the brake circuits 21, 22, which brake pressure, through the So-valves 23, 24, 25, 26, is passed to the wheel brake cylinders.

Once a locking tendency is detected one or more wheels with the aid of the sensors 36, 37, 38, 39 and the electronic controller 5, the anti-locking control mode will commence. The driving motor 7 of the pump 8 commences operation thereby enabling pressure to build up in the pressure conduits 49, 50, 51 which, on the one hand, through the SO-valves, acts upon the wheel cylinders of the wheel brakes and, on the other hand, applies pressure to the pressure chambers of the master cylinder, as shown.

In accordance with the control algorithm, additional signals of the electronic controller result in the re-switch of the electro-magnetically actuable SO- and SG-valves. As a result of the pump pressure in the working chamber 10 and 15, the working pistons 11 and 12, in FIG. 1, are displaced to the right. The push rod piston 11, in known brake force boosters, moves to its right-hand stop 6, (FIG. 1), thereby restoring the brake pedal 1 taking its initial position. The driver's foot, hence, is applied to a restored pedal. In that position, the central valves of the push rod piston 11 and of the intermediate piston 12 open. Pressure fluid, through the central valves can flow back through the return conduits 19 and 20, into the reservoir 3, in a known manner. In the intermediate piston, this is done through the non-pressurized ring chamber 82 of the intermediate piston, while in the push rod piston this is done through the non-pressurized intake chamber 13, the intake port 14 into the return conduit 20. During the entire control mode, the working pistons are maintained in their basic position. The brake pedal, during the entire control mode, also is held in its initial position.

German Patent Application P 37 31 603.6 illustrates a sensing operation of the push rod piston or of the sheet metal piston of the vacuum brake force booster. Depending on the actual position of the working piston, the known pump delivers pre-determined volumes into the working chamber of the master cylinder to place the working piston into the nominal position thereof. This is intended also to position the brake pedal operatively connected to the working piston, before its normal basic position during the control mode.

Figure 2:
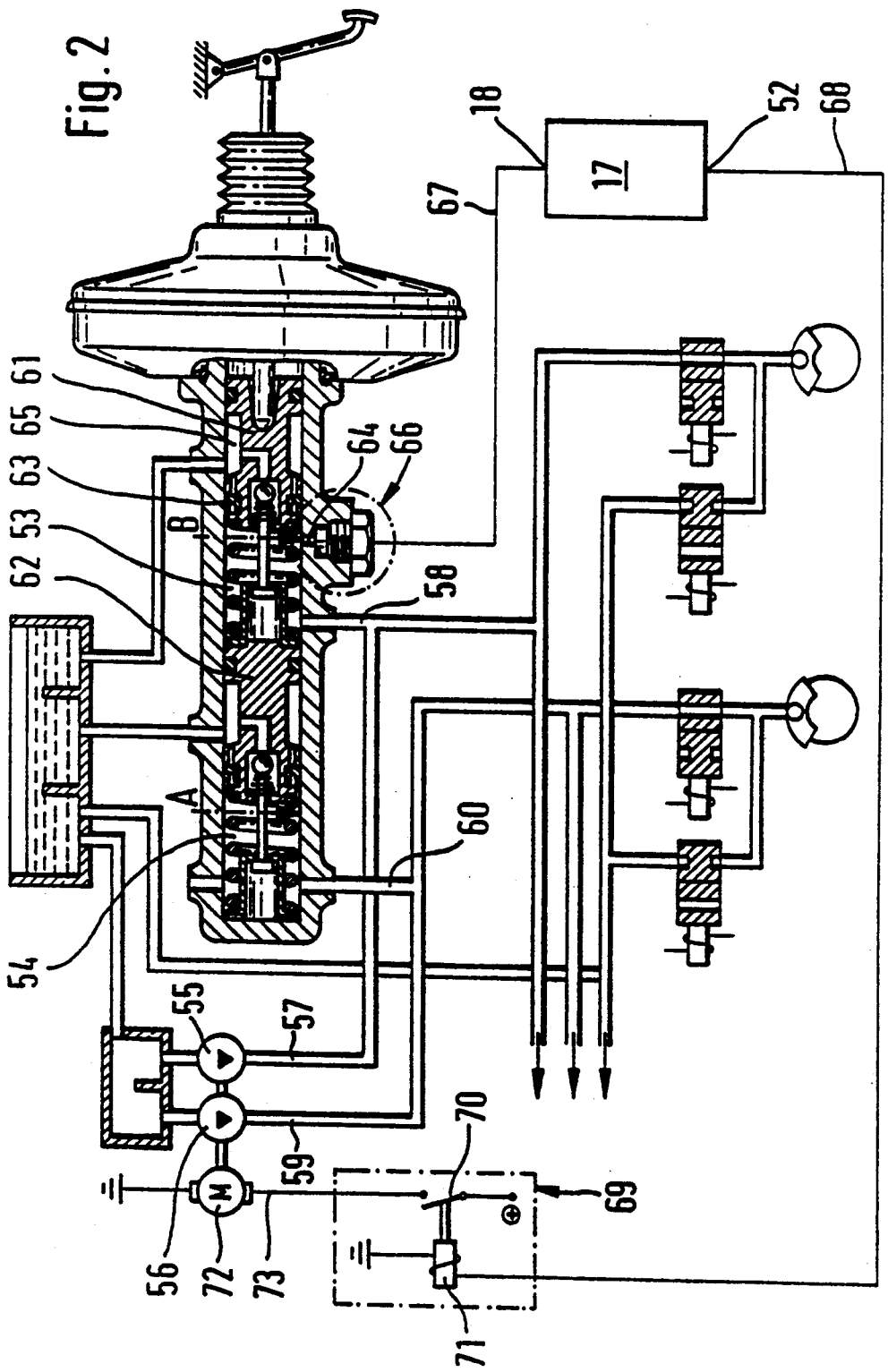
FIG. 2 shows an anti-locking control system in accordance with a preferred embodiment of the system according to FIG. 1.

As opposed to FIG. 1, the device according to FIG. 2 is provided with central control valves including valve closure members. In the example of FIG. 2, the electronic controller 17 performs additional functions as compared with the electronic controller 5 of FIG. 1. Controller 17 according to FIG. 2 includes an additional input 18 and an additional output 52. The functions of the input and output will be explained hereinafter. According to FIG. 2, pressure transducers are provided on the master cylinder at points A and/or B. For the sake of clarity, FIG. 2 only shows the pressure transducer in the position B.

FIGS. 3 and 4 respectively show embodiments of the pressure transducer. As explained in connection with FIG. 1, pump pressure is applied to the working chambers 53, 54 of the master cylinder. In the present instance, for that purpose, two pumps 55, 56 are provided which, through conduits 57, 58 on the one hand and 59, 60 on the other, apply pressure to the working chamber 53 of the push rod piston 61 and the working chamber 54 of the floating piston 62, respectively. At points A and B, the pressure is sensed in the working chambers 54 and 53, respectively.

In the following description of the embodiment according to FIG. 2, the varying pressure situations, for the sake of simplicity, will be described only for point B. If during actuation of the brake pedal in the brake pressure control mode, the push rod piston 61 with the primary sleeve 63 thereof sweeps over the capillary 64, the pressure, in the capillary and in the elements or in the chambers coupled to the capillary, will vary in response to the pressure in the working chamber and in response to the non-pressurized condition in the intake chamber 65. The pressure difference ahead of and behind the primary sleeve, through the pressure transducer designated in its entirety by numeral 66, is converted into an electrical signal. The electric signal is supplied through the line 67 to the input 18 of the electronic controller 17. The signal may be in the form of a YES-NO signal based on the presence or absence of a sensed pressure.

The pressure differential signal is processed, in the electronic controller, according to an installed control algorithm. The controller, at the output 52 thereof, provides a regulating signal. The regulating signal is supplied through the electrical line 68 to the switching relay consists of an electrical switch 70 actuated by an electromagnet 71. The switch closes or opens the power supply line 73 leading to the motor 72. The motor 72 is thus started or stopped in accordance with the regulating signal provided by the electronic controller. Through the electronic controller, hence, the flow rate for the working chamber of the push rod piston and/or the flow rate for the working chamber of the floating piston is controlled in response to the signal at the output 18. This flow rate control in response to the signal at the output 18. This flow rate control will control the position of the pedal before the initial position of the pedal.

The pressure transducer according to FIG. 3 includes a capillary 64 and a chamber filled with a rigid volume 74, especially a viscose-elastic material. The hydraulic pressure prevailing in the working chamber of the master cylinder propagates through the capillary. The pressure acts upon the volume of viscose-elastic material 74 from where the pressure is passed on to a sensor 82 converting the pressure into an electric signal which, through the signal conduit 75, is passed to the electronic controller.

The pressure transducer according to FIGS. 3 and 4 are capable of being screwed into the wall 76 of the master cylinder.

The pressure transducer according to FIG. 4 exhibits a relatively thin portion 77 of the cylindrical inner wall 78. The thin wall portion 77 acts as a membrane deflecting in response to the pressure in the working chamber of the master cylinder. Provided in chamber 79 of the pressure transducer are a volume of pressure transmitting medium and a sensor element 80. The deflection of the membrane causes a force to act on the pressure transmitting medium and to be passed on by the pressure transmitting medium to the sensor element 80. The sensor element 80 converts the force into an electric signal. The electric signal so generated by the pressure transducer, through the signal conduit 81, is passed on to the electronic controller.

I claim:

1. A process for positioning a brake pedal in a desired position during the automatic control mode in an antilocking automotive wheel brake system, said brake pedal operatively coupled to a master cylinder containing brake fluid having at least one piston moved through a travel stroke by said brake pedal from a retracted position to an advanced position in said master cylinder, the brake fluid in a region ahead of said piston caused to be pressurized to develop a wheel brake operating pressure, the brake fluid in a region behind said piston unpressurized, said process including the steps of:
   sensing the pressure in said brake fluid in said master cylinder at a location whereat said piston sweeps past to cause a high pressure and subsequently a low pressure in said master cylinder at said point as said piston is moved through said travel stroke by said brake pedal, to thereby develop a high or low pressure signal corresponding to said piston position in said master cylinder;
   converting said pressure signal to an electrical control signal; and
   utilizing said electrical control signal to control the output of a variable output pump having an outlet connected to direct a flow of brake fluid into a region within said master cylinder so as to cause said piston to be shifted to said desired position.

2. The process according to claim 1 wherein the step of sensing the pressure at said location in said master cylinder includes the step of forming a capillary passage in a wall of said master cylinder at said location, disposing a volume of rigid viscose-elastic material in a chamber into which said capillary passage enters, and generating an electrical signal corresponding to the fluid pressure exerted on said volume of viscose-elastic material by fluid pressure in said capillary.

3. The process according to claim 1 wherein said step of sensing said pressure in said master cylinder at said location comprises the steps of forming a bore in said master cylinder which extends close to the wall of said master cylinder so as to define a thin membrane by a portion of said master cylinder wall at said location, subjecting a volume of a pressure transmitting medium to a force by deflecting said membrane with pressure in said master cylinder at said location, and detecting the force generated by said membrane with a pressure sensor exposed to said pressure transmitting medium.

4. The process according to claim 1 further including the step of detecting an excessive pressure in said master cylinder region ahead of said piston.

5. The process according to claim 1 wherein said step of controlling the output of said pump includes the step of turning on and off an electric drive motor driving said pump.

6. The process according to claim 5 wherein said master cylinder is a dual tandem piston type, and a pair of pumps are provided, each having an output connected to a region in said master cylinder ahead of a respective piston, and wherein said electric dive to both of said pumps is turned off and on to control the output of said pumps.

7. The process according to claim 5 wherein in said pressure sensing step a YES-NO signal is generated corresponding to the presence or absence of pressure in said master cylinder at said location.

* * * * *